United States Patent [19]

Yamaura

[11] Patent Number: 4,809,305

[45] Date of Patent: Feb. 28, 1989

[54] CYCLIC DIGITAL INFORMATION TRANSMISSION SYSTEM

[75] Inventor: Mitsuru Yamaura, Tokyo, Japan

[73] Assignee: Kabushiki Kaisha Toshiba, Kawasaki, Japan

[21] Appl. No.: 886,894

[22] Filed: Jul. 18, 1986

[30] Foreign Application Priority Data

Jul. 30, 1985 [JP] Japan .................. 60-166794

[51] Int. Cl.[4] ............................................. H04L 7/00
[52] U.S. Cl. ........................................ 375/112; 375/106
[58] Field of Search ............... 375/106, 112; 380/15

[56] References Cited

U.S. PATENT DOCUMENTS

| | | | |
|---|---|---|---|
| 4,484,327 | 11/1984 | Hanson | 375/112 |
| 4,503,490 | 3/1985 | Thompson | 375/106 |
| 4,519,073 | 5/1985 | Bertocci et al. | 375/112 |
| 4,667,324 | 5/1987 | Graves | 375/112 |

FOREIGN PATENT DOCUMENTS 56-35059 8/1981 Japan .

*Primary Examiner*—Stephen C. Buczinski
*Assistant Examiner*—Linda J. Wallace
*Attorney, Agent, or Firm*—Oblon, Fisher, Spivak, McClelland & Maier

[57] ABSTRACT

According to a method of this invention, information and check bits in one frame of information to be transmitted are divided into two fields (i.e., a first field not requiring addition of fixed bits, and a second field requiring addition of fixed bits). The characteristic inherent to the bit pattern formed of a sync signal and the second field does not appear in the first field so that the sync signal can be discriminated. The number of fixed bits inserted in one frame can thus be decreased, and transmission efficiency can be improved.

8 Claims, 16 Drawing Sheets

F I G. 30
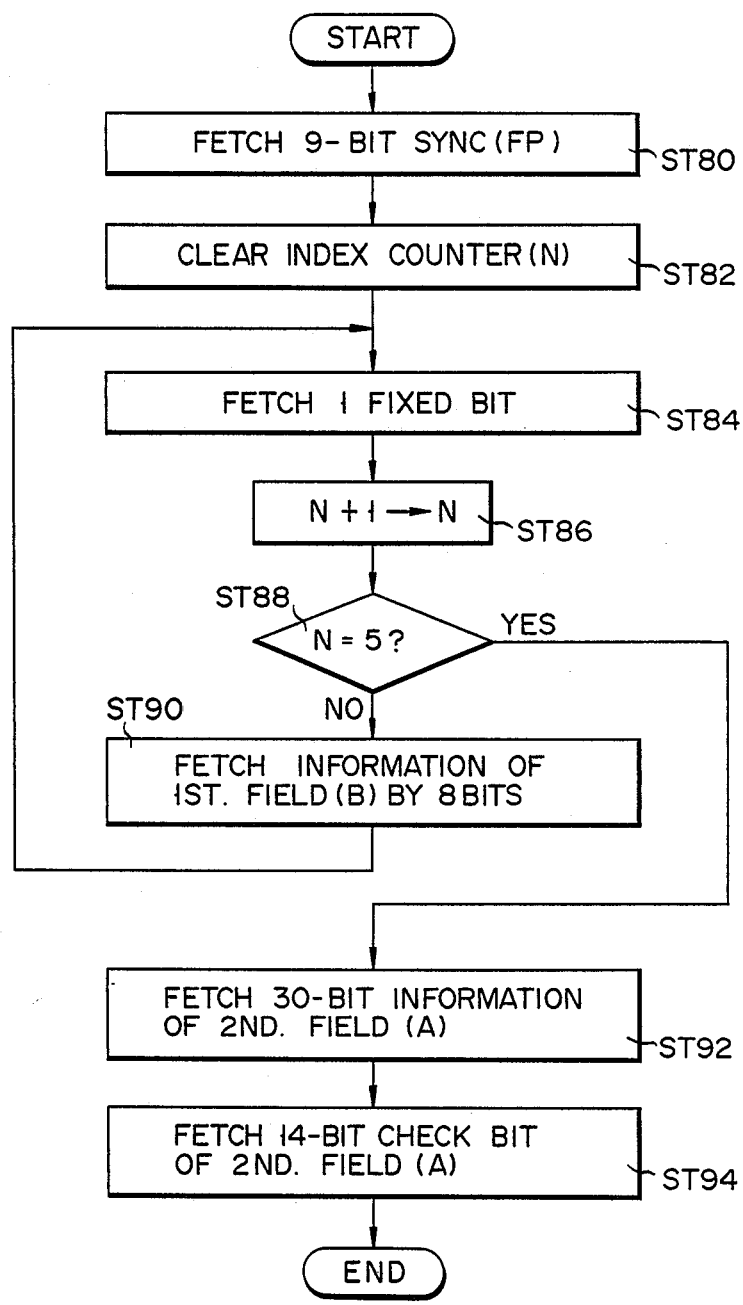

CYCLIC DIGITAL INFORMATION TRANSMISSION SYSTEM

BACKGROUND OF THE INVENTION

The present invention relates to an improvement in a frame synchronization method in cyclic digital information transmission.

A conventional frame synchronization method in cyclic digital information transmission used in a power plant or the like employs a unique pattern method using a fixed bit, as in the "Frame Synchronization Method in Cyclic Digital Information Transmission" described in Japanese Patent Publication No. 56-35059, for the following reason. Assume that the synchronization of data is broken by a disturbance such as irregular phenomenon of a communication circuit, is pulled out, and is then set in a pull-in start state after elimination of the disturbance. In this case, pull-in of the synchronization may be performed at a wrong timing if a sync code is not unique. If this occurs, when data of a constant pattern is sent out for a long period of time, wrong information is sent to a given destination for that long period of time. In addition, information is erroneously reset due to this error, resulting in inconvenience. In order to eliminate such an inconvenience, a sync code pattern used in a frame synchronization method is a unique pattern which cannot be accidentally created in terms of data structure.

A format in the frame synchronization method described in Japanese Patent Publication No. 56-35059 will be briefly described with reference to FIG. 23. One frame has a 90-bit length consisting of a 10-bit sync signal, a total of 72 bits of information and check bits, and eight fixed bits each inserted in every 8 information or check bits. The sync signal consists of nine continuous "0"s with one bit of "1" following the nine "0"s, i.e., a total of 10 bits. Since the fixed bits are inserted as described above, nine continuous "0"s do not occur except for in the sync signal. The sync signal can thus be discriminated as a so-called unique pattern. According to this method, however, transmission efficiency is degraded by addition of fixed bits for defining the sync signal as the unique pattern. In order to transmit data as much as possible within a limited transmission rate (e.g., in the case of a protective relay device), the number of fixed bits must be decreased as much as possible.

SUMMARY OF THE INVENTION

The present invention has been made in consideration of the above situation, and has as its object to provide a frame synchronization method in a cyclic information transmission system for achieving a unique pattern with a minimum number of fixed bits to improve transmission efficiency.

According to the method of the present invention, the information and check bits within one frame of information to be transmitted are divided into two fields (i.e., a first field not requiring addition of fixed bits, and a second field requiring addition of fixed bits). The characteristic inherent to the bit pattern constituted by the second field and the sync signal is not assigned to the bit pattern of the first field, thereby obtaining the frame synchronization method for discriminating the sync signal. The number of fixed bits inserted in one frame is decreased to improve transmission efficiency.

BRIEF DESCRIPTION OF THE DRAWINGS

FIG. 30 is a flow chart showing a modification of that in FIG. 29.

DETAILED DESCRIPTION OF THE PREFERRED EMBODIMENTS

Figure 1:
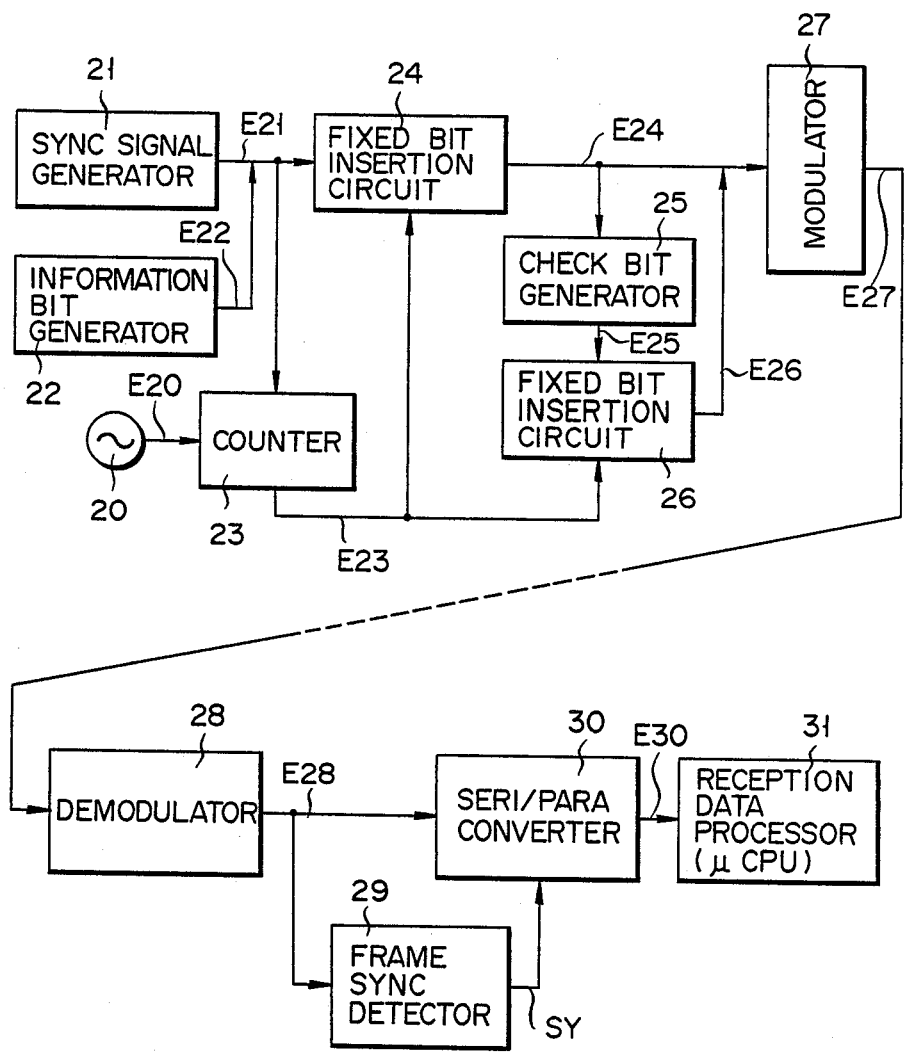
FIG. 1 is a block diagram showing an embodiment of an apparatus using a method of the present invention.

FIG. 1 is a block diagram showing an embodiment of an apparatus employing a frame synchronization method in a cyclic information transmission system according to the present invention. The apparatus uses formats shown in FIGS. 2 to 14.

Referring to FIG. 1, clock generator 20 supplies clocks E20 to the respective components. Sync signal generator 21 generates sync signal E21 of nine continuous bits of "0". Information bit generator 22 generates signal E22 including information bits to be transmitted. Counter 23 counts outputs from generator 20 and generates 44-bit count output E23 corresponding to a first field (A) (to be described later) after generation of sync signals is completed (clock generator 20 supplies clocks to the respective components of FIG. 1 excluding counter 23, and this clock flow, indicated by an arrow, is a conventional technique and is omitted in FIG. 1). Fixed bit insertion circuit 24 inserts in signal E21 and E22 one fixed bit of "1" immediately after generation of output E23 from counter 23 and for every 8 information bits, and generates resultant signal E24.

Check bit generator 25 adds, e.g., a conventional CRC (Cyclic Redundancy Check Code) check code to signal E24 from insertion circuit 24, and generates resultant signal E25. Fixed bit insertion circuit 26 inserts one fixed bit of "1" every eight bits for the remaining information bits and the check bits when insertion circuit 24 stops generating the fixed bits while output E23 is being generated by counter 23. Insertion circuit 26 generates signal E26. Outputs E24 and E26 from fixed bit insertion circuits 24 and 26 are combined serially along the time base. The composite signal is modulated by modulator 27 to signal E27 for transmission.

Demodulator 28 demodulates signal E27 sent from modulator 27 to an original code form and generates demodulated signal E28. Frame sync detector 29 detects pattern FP of the sync signal (E21) and supplies detected sync output SY to a seri/para converter 30. Using output SY from detector 29 as reference timing of the frame, converter 30 performs serial/parallel conversion of a reception code included in signal E28. Converter 30 then supplies parallel output E30 to reception data processor 31 (output SY represents a boundary between the continuous frames and serves as a start instruction for serial-to-parallel data conversion of each frame of frame data in signal E28). Processor 31 comprises a microcomputer (μCPU). The constitution of the microcomputer itself is not characteristic, and a description of the hardware thereof will also be omitted. Seri/para converter 30 is implemented by a known technique, and a description thereof will also be omitted. However, the internal arrangement and function of frame sync detector 29 are closely associated with the present invention and will be exemplified later with reference to FIG. 4.

Figure 2:
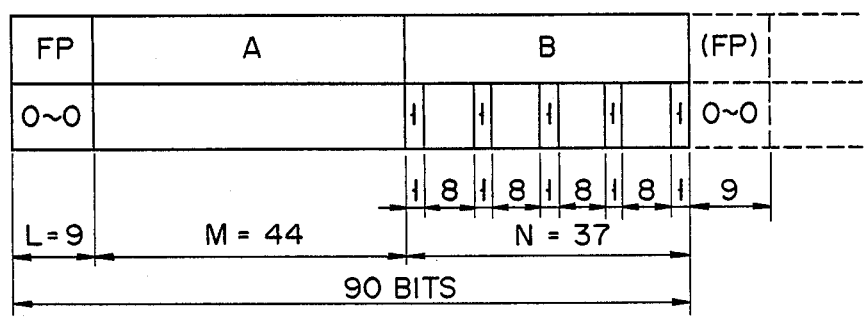
FIG. 2 is a data format (bit pattern) of one-frame data according to the present invention.

FIG. 2 shows a format used in the present invention. Reference symbol FP denotes a sync signal; and A and B, first and second fields, respectively. The first field is formed of one or both of information and check bits. The second field is formed of fixed bits and one or both of information and check bits. First field A and second field B thus constitute a combination of information bits +check bits +fixed bits. Bit length L of sync signal FP has 9 bits, all "0"s. Second field B includes end bits, as fixed bits of "1", and information or check bits. One fixed bit of "1" is inserted for every eight bits. The total number of inserted fixed bits is 5. Bit length M of field A has 44 bits and bit length N of field B has 37 bits. The length of one frame has 90 bits, as in the conventional frame length in FIG. 23.

Figure 3:
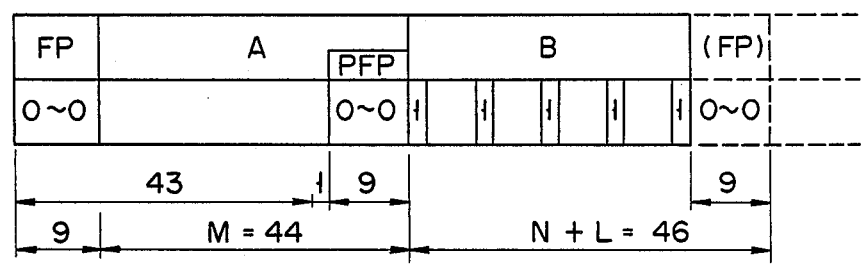
FIG. 3 is a bit pattern format for explaining an advantage of the format in FIG. 2.

FIG. 3 is a code pattern format for explaining an advantage of the format in FIG. 2, showing the case wherein spurious sync signal PFP appears at the end of field A of FIG. 2. The spurious sync signal is formed of 9 bits of all "0"s, i.e., the same pattern as signal FP (to be referred to as a sync pattern hereinafter). The spurious sync signal is distinguished from signal FP in the following manner.

Second field B is present immediately before true sync signal FP. As fixed bits of "1" are inserted in units of eight bits in field B, the sync pattern (nine continuous bits of "0") cannot be produced. A sum of the bit length for which the sync pattern does not appear and the bit length of the sync signal is N+L=46 bits. FIG. 3 shows the relationship between the sync signal of the current frame and the sync signal (FP indicated by the broken line) of the next frame. A length for which the sync pattern appears after the non-sync-pattern interval in field A is length M of field A. In this case, the length has 44 bits. M is thus smaller than N+L=46 (L+N>M). First field A cannot be the same pattern as in the case wherein the sync signal follows second field B. Even if signal PFP appears at a portion excluding the end of field A, the underlined relationship is kept unchanged. Therefore, signal FP can be clearly distinguished from signal PFP.

Figure 4:
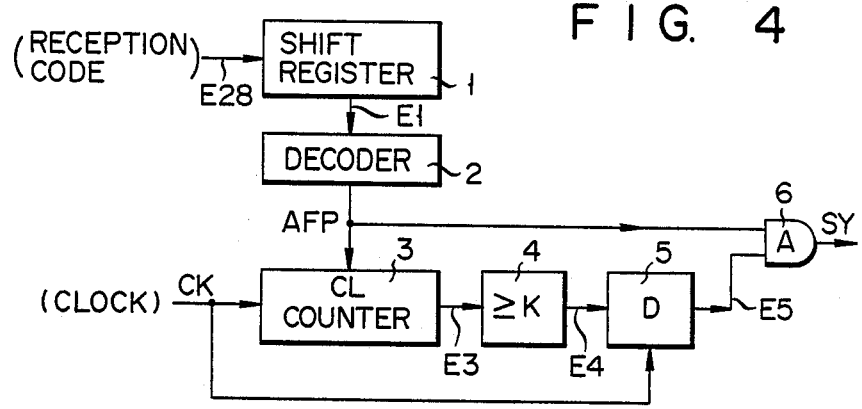
FIG. 4 is a block diagram of a circuit for discriminating the relationship in FIG. 3.

FIG. 4 is a block diagram showing an arrangement of a circuit for discriminating the relationship in FIG. 3, i.e., a circuit for detecting true sync signal FP from one-frame data including spurious sync signal PFP. In this circuit, the reception code included in decoded signal E28 is stored in shift register 1. Content E1 of register 1 is decoded by decoder 2. If a sync pattern appears, output AFP is generated (i.e., decoder 2 comprises a comparator using the sync pattern as comparison data). Code pattern detection by the shift register and the decoder is a conventional technique, and a detailed description thereof will be omitted. Output AFP is applied to clear terminal CL of counter 3 so that counter 3 is cleared. Counter 3 counts clocks (of the same frequency as that of clock E20 in FIG. 1) synchronized with the reception code. Count content E3 of counter 3 is compared by comparator 4 with constant K (K is defined as N+L−1=45). If content E3 exceeds K, comparator 4 generates output E4. Output E4 is delayed by delay element (D type flip-flop) 5 by one bit. Delayed output E5 is applied to one input terminal of AND gate 6. Output AFP is applied to the other input terminal of AND gate 6. Output AFP is produced whether signal E28 includes the true sync signal or whether it includes the spurious sync signal. However, only a sync signal produced after counter 3 is cleared and counts 45 or more clocks CK is a true sync signal (e.g., in the case of FIG. 3, the count one bit prior to appearance of spurious sync signal PFP is a maximum of 44−1=43). AND gate 6 generates sync detection output SY upon reception of true sync signal FP.

Figure 24:
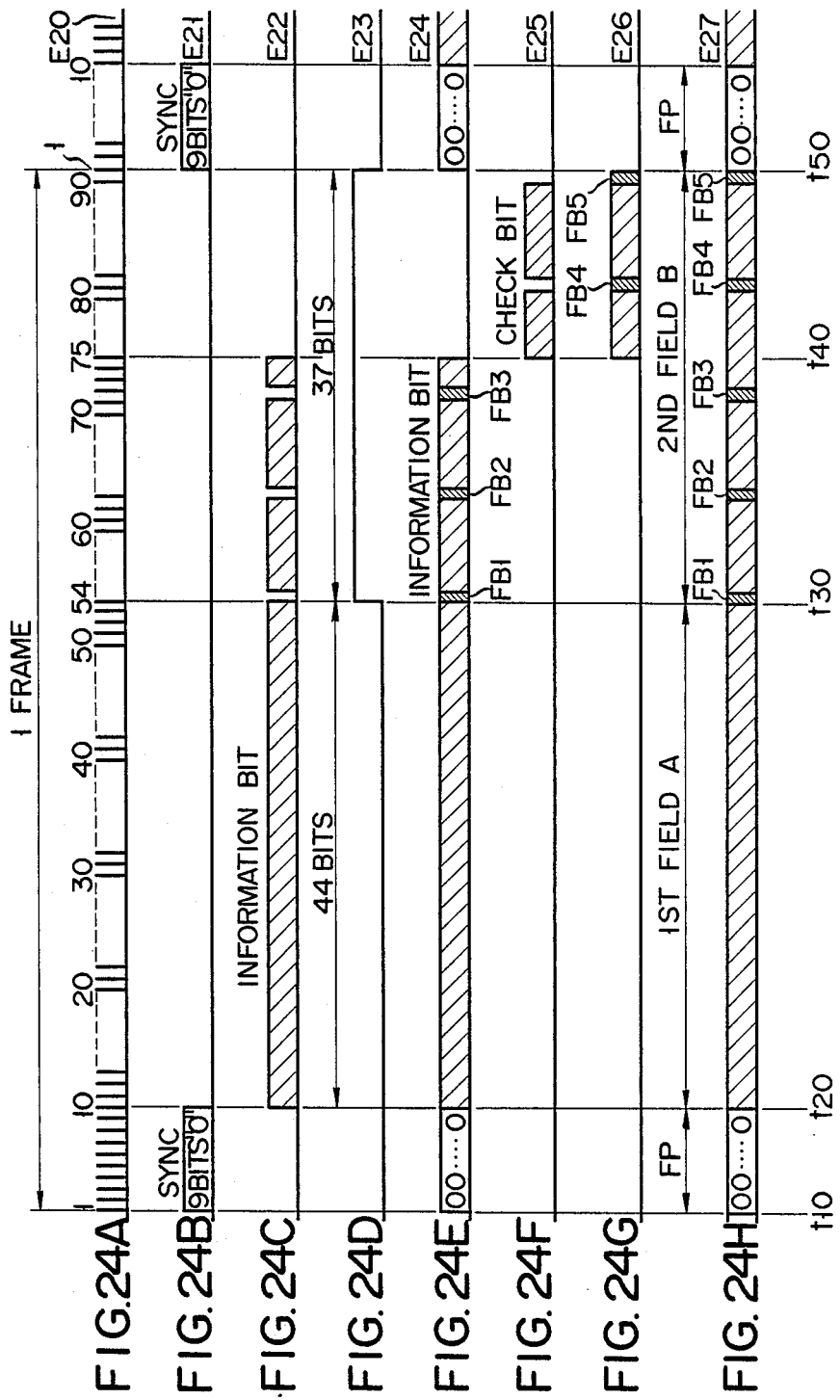
FIGS. 24A to 24H are respectively timing charts showing generation timings of signals E20 to E27 when the arrangement in FIG. 1 generates the bit pattern of FIG. 2.

The above circuit extracts sync signal FP from the format in FIG. 2. The format in FIG. 2 can be easily created by a conventional technique. However, a method of forming the format of FIG. 2 will be described in detail with reference to FIGS. 24 to 26.

Figure 23:
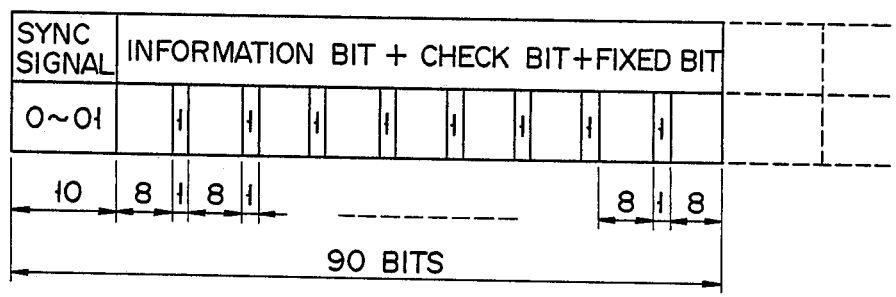
FIG. 23 is a format according to a method excluding that of the present invention.

The format in FIG. 2 has the same frame length, i.e., 90 bits, as that of the conventional format in FIG. 23. However, first field A does not require fixed bits so that four bits can be utilized as information bits, thus achieving the prescribed object of an improvement in transmission efficiency. In the field of protective relay devices requiring high reliability and high speed, transmission efficiency is improved while unique pattern conditions are maintained, thus providing a great practical effect.

Figure 5:
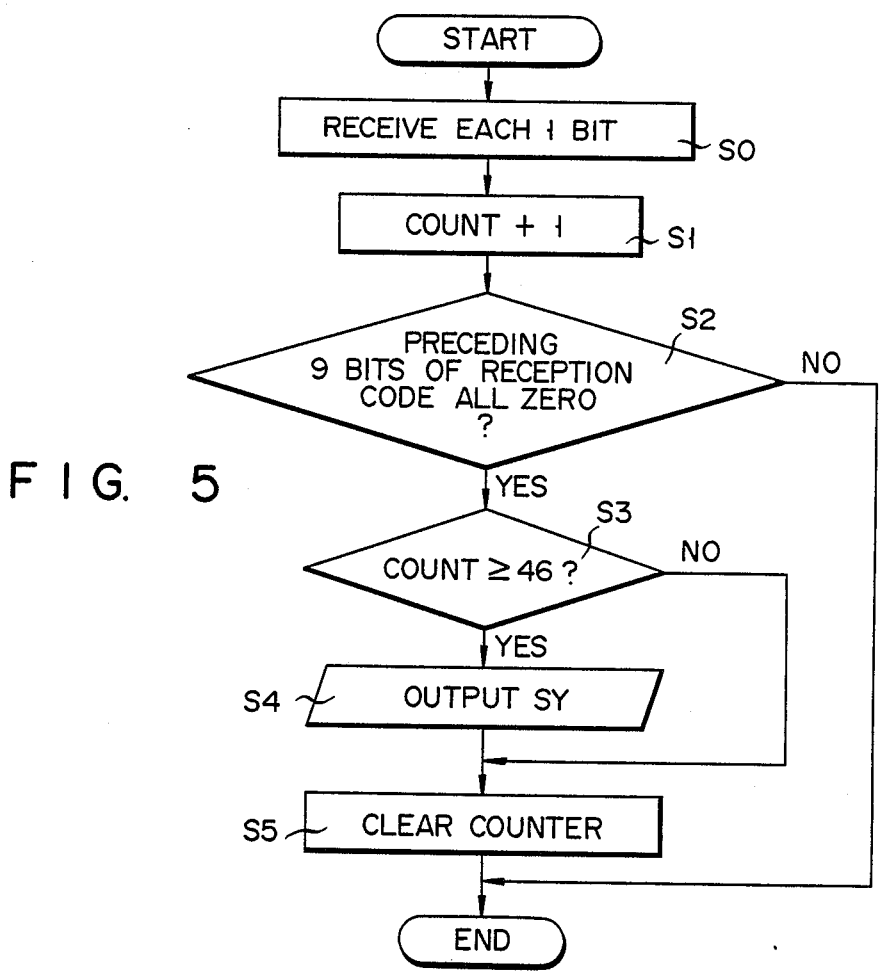
FIG. 5 is a flow chart for explaining discrimination procedures of the relationship in FIG. 3.

FIG. 5 is a flow chart for discriminating the relationship shown in FIG. 3 by means of software. The procedures of a microcomputer constituting frame sync detector 29 of FIG. 1 are shown in FIG. 5. A microcomputer (not shown) fetches the reception code (E28) bit by bit (step S0), and a soft counter (not shown) in the microcomputer is incremented one by one accordingly (step S1). In step S2, the microcomputer checks whether the bits of the 9-bit reception code E28 are all "0"s. If NO in step S2, the flow ends. However, if YES in step S2, the microcomputer checks the count of counter 3 in step S3. If the count exceeds 46 (=N+L), i.e., if YES in step S3, sync output SY is produced in step S4, and counter 3 is cleared in step S5. However, if the count of counter 3 is less than 45, i.e., if NO in step S3, the flow directly jumps to step S5. Counter 3 is then cleared and no output SY is produced. The above operations by means of software are the same as those of the hardware in FIG. 4. Thus, software detection of the sync signal (FP) from the reception code (E28) can be conveniently performed, as shown in FIG. 5.

Figure 6:
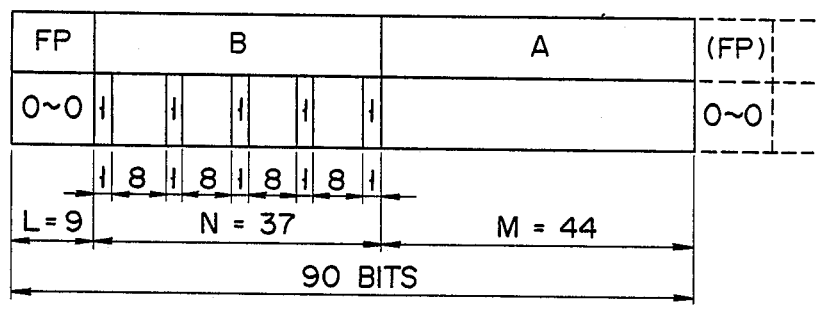
FIG. 6 is a format showing a modification of that in FIG. 2.

FIG. 6 is a format showing a modification of that in FIG. 2. Compared with the format in FIG. 2, the format in FIG. 6 is the same except that first and second fields A and B are reversed.

Figure 7:
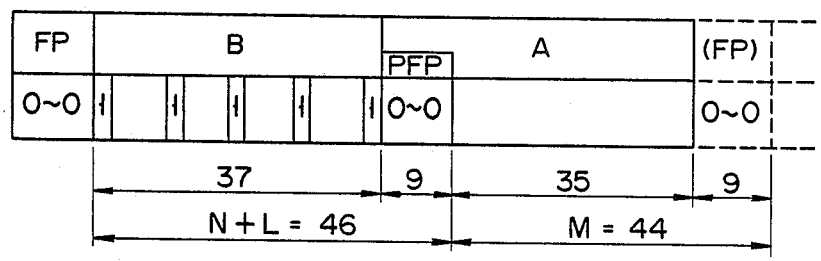
FIG. 7 is a code pattern format for explaining an advantage of the format in FIG. 6.

FIG. 7 is a code pattern format for explaining an advantage of the format of FIG. 6. More specifically, FIG. 7 explains a pattern discriminated from a pattern wherein second field B follows sync signal FP even if spurious sync signal PFP appears in first field A.

As shown in FIG. 7, until the true sync signal (FP of the broken line) after detection of signal PFP is detected (Case 1), a maximum time period corresponding to 44 bits elapses. Until the spurious sync signal is detected after detection of signal FP (Case 2), at least a time period corresponding to the sum of second field length N and spurious sync signal length L, i.e., N+L=46 bits elapses. If signal PFP is not present at the beginning of first field A, a difference between the number of bits (44) of Case 1 and the number of bits (≧46) of Case 2 is increased. Therefore, when the format of FIG. 6 is used, the same effect as in FIG. 2 can be obtained, i.e., spurious sync signal PFP can be distinguished from true sync signal FP.

Figure 8:
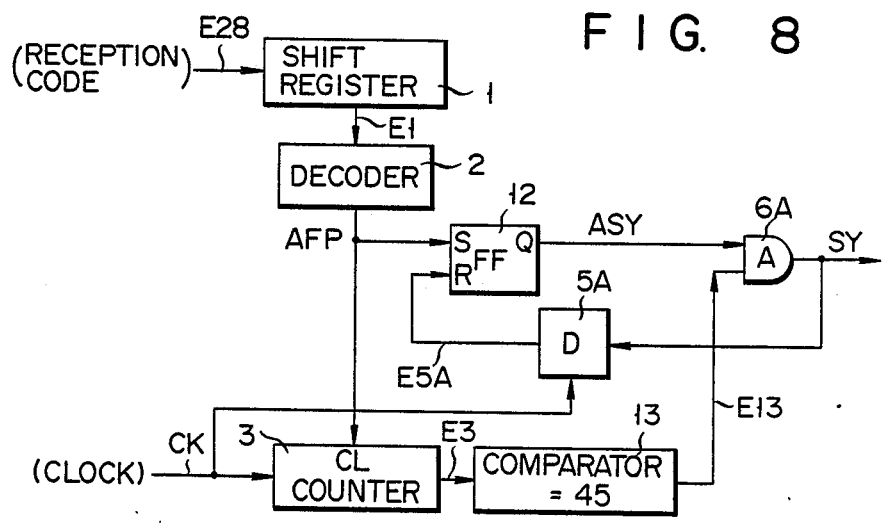
FIG. 8 is a block diagram showing a circuit for discriminating the relationship in FIG. 7.

FIG. 8 is a block diagram of a circuit for discriminating the relationship shown in FIG. 7. The arrangement in FIG. 8 is similar to that of FIG. 4, except that in FIG. 8, flip-flop 12 is added, and comparator 13 is used in place of comparator 4 of FIG. 4. In the same manner as in FIG. 4, when output AFP is generated from decoder 2 according to the sync pattern included in the reception code (E28), counter 3 is cleared. Output AFP is supplied to terminal S of flip-flop 12 so that flipflop 12 is set and output ASY is output therefrom. Output ASY is input to AND gate 6A. When counter 3 counts 45 clocks CK (N+L-1=45) upon appearance of output ASY, comparator 13 generates output E13 in response to count output E3. Sync detection output SY is then generated by AND gate 6A. Upon generation of output SY, delay element 5A outputs E5A after one bit corresponding to one clock CK. When output E5A is supplied to terminal R of flip-flop 12, it is reset and prepared for the next sync pattern detection operation. Output ASY is also generated by spurious sync signal PFP. However, as described with reference to FIG. 7, counter 3 is cleared by a maximum of 44 and the count does not reach 45. In this case, output E13 or SY is not generated. Sync signal FP is thus discriminated from signal PFP.

The only difference between the formats in FIGS. 2 and 6 is that the first and second fields are reversed. One of the formats in FIG. 2 or 6 can be selected in consideration of data postprocessing due to the relationship between the information and fixed bits.

Figure 9:
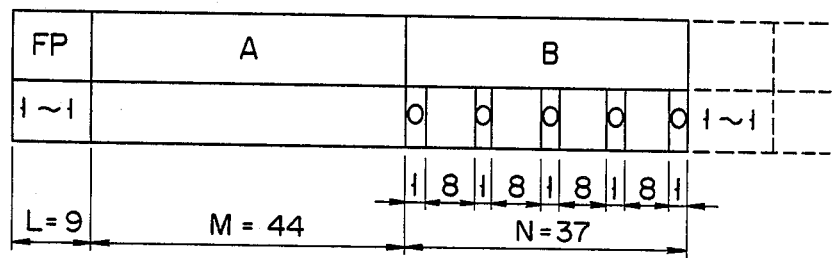
FIG. 9 is a format showing another modification of that in FIG. 2.

FIG. 9 is a format showing another modification of that in FIG. 2. In FIG. 9, only the contents of sync signal FP and the fixed bits of second field B are reversed, compared with those of FIG. 2. More specifically, "1" and "0" are reversed. With such an arrangement, the relationship is kept unchanged.

Figure 10:
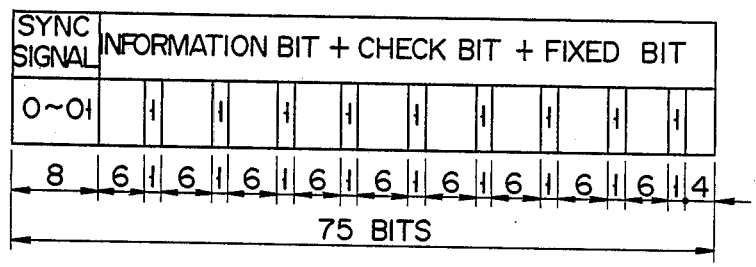
FIG. 10 is a data format when a method excluding the present invention is used.

FIG. 10 shows a format when the method of the present invention is not used. One frame consists of an 8-bit sync signal and other 67 bits, a total of 75 bits. The sync signal consists of seven continuous bits of "0" and one bit of "1". The fixed bit of "1" is inserted for each information or check bit. The sum of information and check bits is a total of 58 bits.

Figure 11:
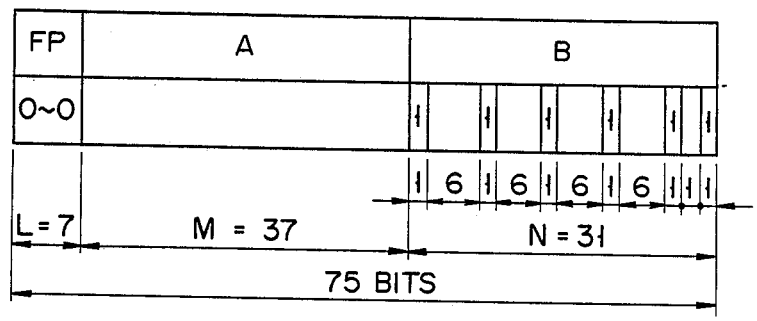
FIG. 11 is another format used in the present invention.

FIG. 11 shows another format used in the present invention. This format has a conspicuous characteristic compared with that in FIG. 10. Referring to FIG. 11, the sync signal has length L=7 bits of all "0", the length of first field A is M=37 bits, and the length of second field B is N=31 bits, all of which satisfy relation L+N>M. Fixed bits of "1" are set at both ends of second field B, and one fixed bit of "1" is inserted in a data string therebetween by at least an interval of L−1=6 bits. An apparent or spurious sync signal is not produced from field B. The number of bits excluding the sync signals and the six fixed bits in one frame is 37+6×4+1=62. Compared with the case of FIG. 10, the number of bits thus increases by 4. Therefore, the object of the invention of the present application, i.e., an improvement in transmission efficiency, can also be achieved by the format in FIG. 11.

Figure 12:
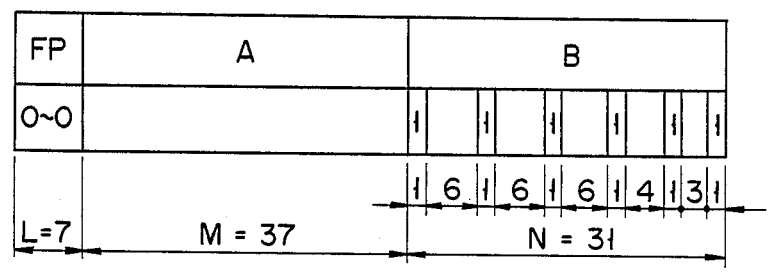
FIG. 12 is a format showing a modification of that in FIG. 11.

FIG. 12 is a format showing a modification of that in FIG. 11. Compared with the case in FIG. 11, the positions of fixed bits in second field B are changed. More specifically, at the end of the second field, each fixed bit of "1" is inserted between the three and four information or check bits, and after the three information or check bits. This differs from the case in FIG. 11 wherein the number of information or check bits is six or one. However, a total number of fixed bits in FIG. 12 is equal to that in FIG. 11. The fixed bits are inserted such that the sync pattern is not produced in both FIGS. 11 and 12. The same effect as in FIG. 11 can be obtained in FIG. 12.

Figure 13:
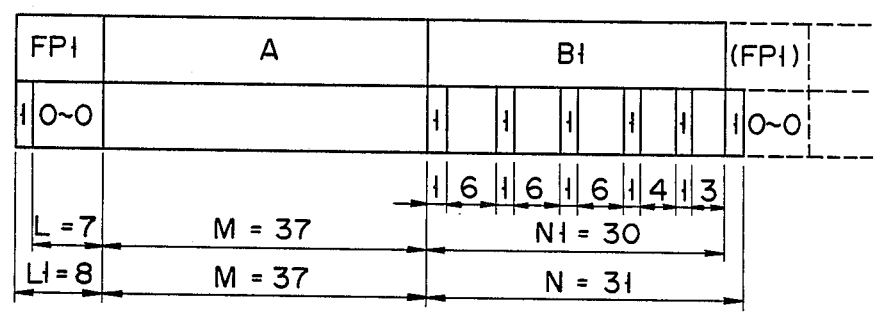
FIGS. 13 and 14 are formats showing modifications of that in FIG. 12, respectively.

FIG. 13 is a format showing a modification of that in FIG. 12. The format in FIG. 13 is substantially the same as that in FIG. 12, except that bit assignment at the boundary between sync signal FP1 and second field B1 is different. More specifically, sync signal FP1 consists of one bit of "1" and seven bits of "0" following the one bit of "1". No fixed bit is inserted at the end of second field B1. If the last fixed bit "1" of the second field in FIG. 12 is inserted in the sync signal, the boundary is shifted by one bit. In this sense, the formats in FIGS. 12 and 13 are based on an identical concept. Mere modifications such as those shown in FIG. 12 or 13 fall within the scope of the present invention.

Figure 14:
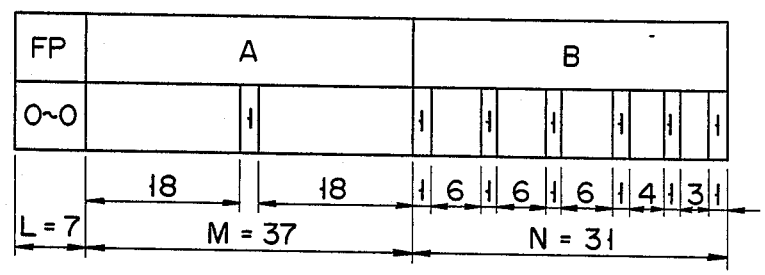

FIG. 14 is a format showing another modification of that in FIG. 12. The format in FIG. 14 is substantially the same as that in FIG. 12, except that one fixed bit of "1" is inserted in first field A. Insertion of the fixed bit is not required in the previous formats. However, in order to indicate a partition boundary between adjacent data strings, the fixed bit is inserted in the first field. In this case, the fixed bit is inserted regardless of length L of the sync signal. The characteristic of the bit pattern of first field A is the same as that shown in FIG. 12. Therefore, the modification shown in FIG. 14 can also fall within the scope of the present invention.

It is not true, however, that enlargement of the concept of the conventional method in FIG. 23 is within the scope of the present invention. In the case of FIG. 23, the fixed bits are inserted in association with the length of the sync signal throughout the frame, and frame synchronization is performed under such conditions.

Figure 15:
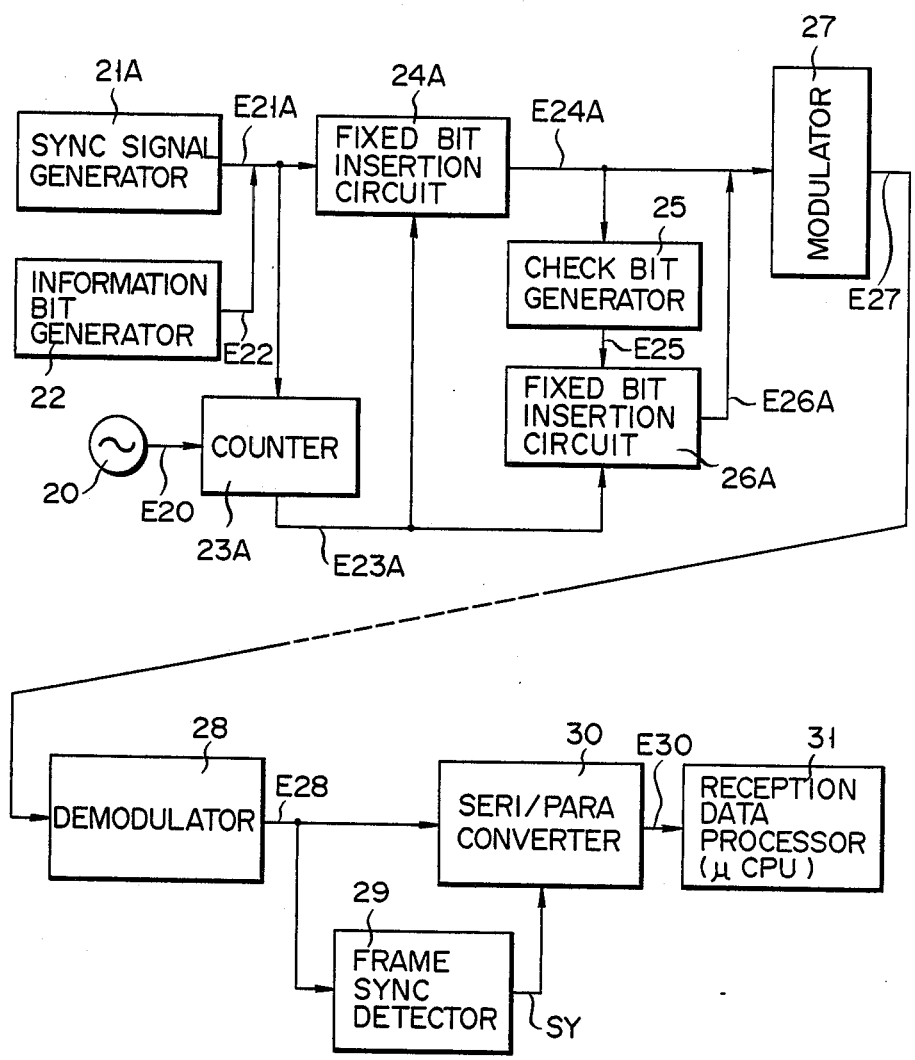
FIG. 15 is a block diagram of a second embodiment according to the method of the present invention.

FIG. 15 is a block diagram showing a second embodiment of the present invention, and FIGS. 16 to 22 show formats used therein. The block diagram in FIG. 15 is substantially the same as that in FIG. 1, except that operations of components 21A, 23A, 24A and 26A are slightly different from components 21, 23, 24, and 26 in FIG. 1, respectively. Sync signal generator 21A generates 8-bit sync signal E21A consisting of seven bits of "0" and one bit of "1" following the seven bits. Counter 23A generates output E23A 36 bits after the end of sync signal E21A. Fixed bit insertion circuit 24A inserts one fixed bit of "1" immediately after generation of output E23A from counter 23A or for every six information bits. Fixed bit insertion circuit 26A generates one fixed bit of "1" for every six bits in the remaining string of information and check bits. Other arrangements of FIG. 15 are the same as those of FIG. 1.

Figure 16:
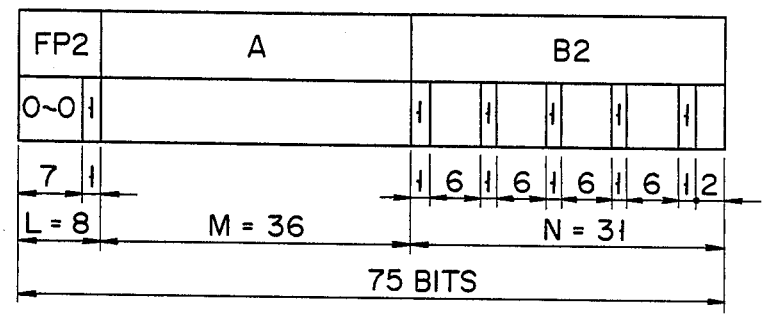
FIG. 16 is a format used in the second embodiment.

FIG. 16 is a format used in the second embodiment of the present invention. One frame consists of 8-bit sync signal FP2, 36-bit first field A, and 31-bit second field B2, a total of 75 bits. Signal FP2 is formed of seven bits of "0" and one bit of "1" following the seven bits of "0". The bit of "1" in signal FP2 is located at the boundary between fields A and B2. Field B2 is similar to that of FIG. 11. However, field B2 in FIG. 16 does not have the same fixed bit of "1" at the end of second field B of FIG. 11. This bit position is assigned to an information or check bit. Even so, a total number of bits of the sync signal and the fixed bits is 13, which is the same as that in FIG. 11. The pattern formed of second field B2 and sync signal FP2 does not appear near first field A. Therefore, a synchronization pattern can be detected in the same manner as in the previous embodiment, which will be described in more detail with reference to FIG. 17.

Figure 17:
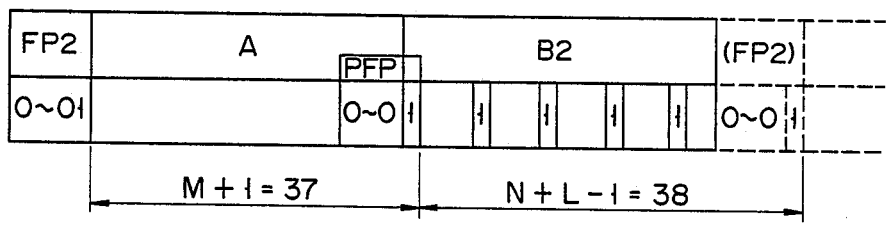
FIG. 17 is a code pattern format for explaining an advantage of the format in FIG. 16.

FIG. 17 is a code pattern format for explaining the advantage of the format in FIG. 16, particularly when spurious sync signal PFP appears near the end of first field A and the beginning of second field B2. In this case, the length from the end of sync signal FP2 to the end of spurious sync pattern 0−01 is M+1=37 bits. The length from the second bit of second field B2 to the end of the next sync pattern (FP2 of a broken line) is N+L−1=38. Therefore, sync signal FP2 can be clearly distinguished from spurious sync signal PFP.

Figure 18:
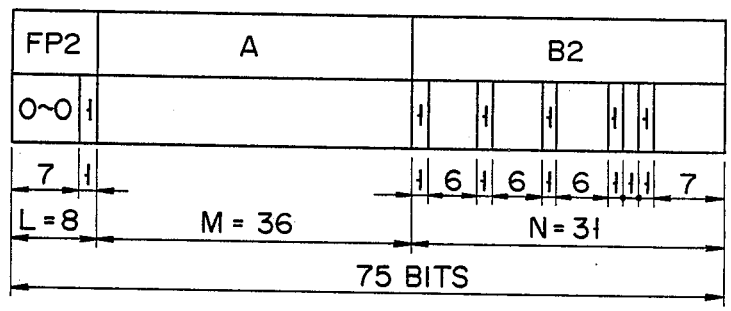
FIG. 18 is a format showing a modification of that in FIG. 16.

FIG. 18 is a format showing a modification of that in FIG. 16. The format in FIG. 18 is substantially the same as that in FIG. 16, except that the bit pattern near the end of second field B2 is different. More specifically, the fixed bit of "1" is inserted between one and seven bits in FIG. 18, while the fixed bit of "1" is inserted between six and two bits in FIG. 16. A total number of fixed bits in FIG. 18 is the same as that in FIG. 16. The same effect as the format in FIG. 16 can be obtained in that of FIG. 18. This will be described with reference to FIG. 19.

Figure 19:
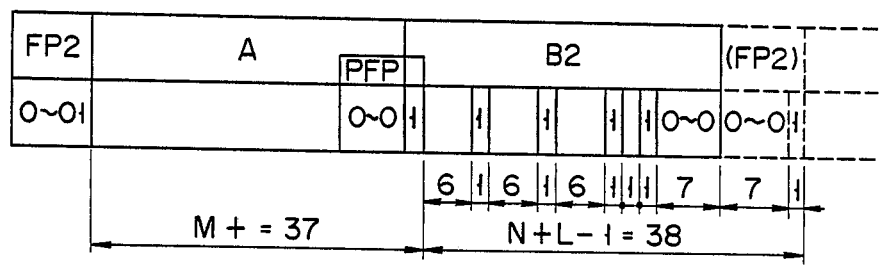
FIG. 19 is a code pattern format for explaining an advantage of that in FIG. 18.

FIG. 19 is a code pattern format for explaining the advantage of the format in FIG. 18. The format in FIG. 19 is substantially the same as that in FIG. 17, except that the last seven bits of second field B2 are all "0"s. The beginning of the sync signal (FP of a broken line) of the next frame is "0". The sync pattern (i.e., seven bits of "0"+one bit of "1") is not formed by the last seven bits of "0"). Therefore, a sum of the interval for which the synchronization pattern does not appear and the length of sync signal is N+L−1=38 bits, thus producing the same results as in FIG. 17.

Figure 20:
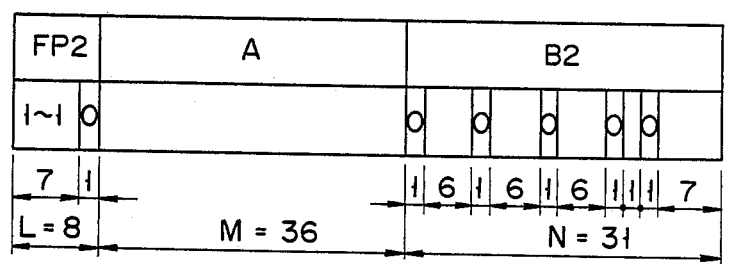
FIG. 20 is a format showing a modification of that in FIG. 18.

FIG. 20 is a format showing a modification of that in FIG. 18. The format in FIG. 20 is the same as that in FIG. 18, except that "1" and "0" are reversed.

The format or formats in FIG. 16 or FIGS. 18 to 20 are slightly different from those prior to FIG. 14. In the formats up to FIG. 14, the sync signal bits are all "1"s or "0"s, or logic values "1" or "0" different from the logic values of adjacent bits are assigned at the boundary with second field B, as shown in FIG. 13. However, in the formats in FIG. 16 and the subsequent figures, logic value "1" (or "0") different from the logic value "0" (or "1") of the majority bits is inserted between sync signal FP and first field A. In this case, L, M and N satisfy the following inequality L+N−1>M+1, i.e., L+N>M+2, as described with reference to FIG. 17 or 19. However, since the fixed bit is not required at the end of second field B2, data transmission efficiency is substantially the same as that in FIG. 2.

Figure 21:
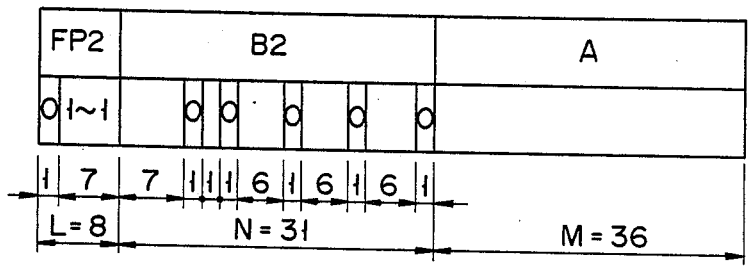
FIG. 21 is a format showing a modification of that in FIG. 19.

FIG. 21 is a format showing a modification of that in FIG. 20. The format in FIG. 21 is substantially the same as that in FIG. 20, except that first and second fields A and B2 are reversed. The relationship between FIGS. 20 and 21 is the same as that between FIGS. 2 and 6. The same effect as in FIG. 20 can be obtained in FIG. 21.

Figure 22:
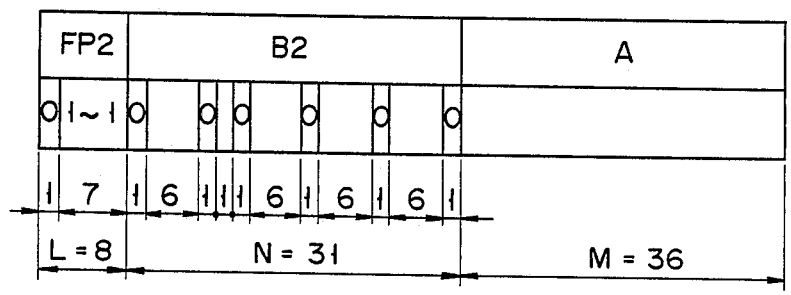
FIG. 22 is a format showing a modification of that in FIG. 21.

FIG. 22 is a format showing a modification of that in FIG. 21. The format in FIG. 22 is substantially the same as that in FIG. 21, except that the beginning of second field B2 is the fixed bit of "0". The format in FIG. 22 is similar to that in FIG. 14. Even if fixed bits are added for some purpose, the advantage of the present invention is not lost unless fixed bits are inserted at an interval less than a predetermined value throughout the frame. In addition, even if the contents of the sync signal are regarded as "01 - 10" including the fixed bit, the boundary between the sync signal and the first or second field is only subjectively changed. Thus, the scope of the present invention does not change.

FIGS. 24A to 24H show generation timings of signals E20 to E27 in order to cause the arrangement of FIG. 1 to form the bit pattern (format) of FIG. 2. Signal E24 in FIG. 24E is generated by fixed bit insertion circuit 24, shown in FIG. 25. Signal E26 in FIG. 24G is generated by fixed bit insertion circuit 26 shown in FIG. 26.

Each bit of the 90-bit, one-frame format in FIG. 2 is defined by clock E20 (FIG. 24A) generated by clock generator 20 in FIG. 1. In synchronism with clock E20, sync signal E21 (FIG. 24B) of nine continuous bits of all "0"s is output from sync signal generator 21. Information bit generator 22 generates, from trailing edge (t20) of signal E21, corresponding information bit signal E22 (FIG. 24C) for a period of time to the 65 clocks of E20 (t40).

Counter 23 starts counting clocks E20 upon generation (t10) of sync signal E21. When the count of counter 23 reaches 54 (t30), it outputs carrier output E23 (FIG. 24D). Counter 23 is temporarily reset in response to the next sync signal E21, and output E23 is disabled at the start (t50) of E21. Signal E23 representing the duration (t30 to t50) of second field B in one-frame data (t10 to t50) can be obtained.

Figure 25:
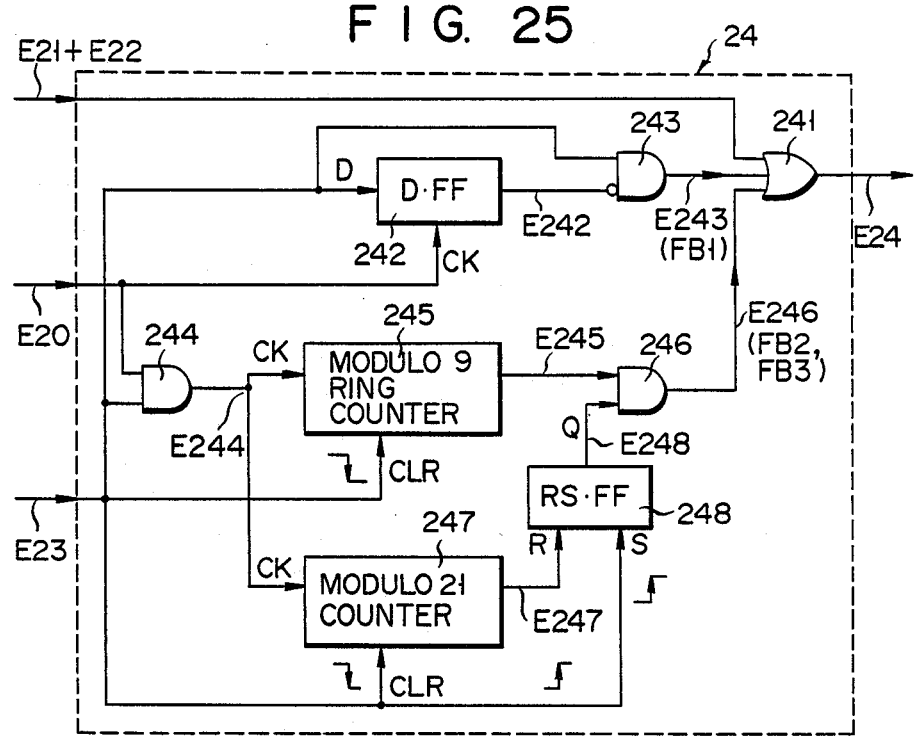
FIG. 25 is a circuit diagram showing an arrangement of fixed bit insertion circuit 24 when the bit pattern in FIG. 2 is created.
Figure 26:
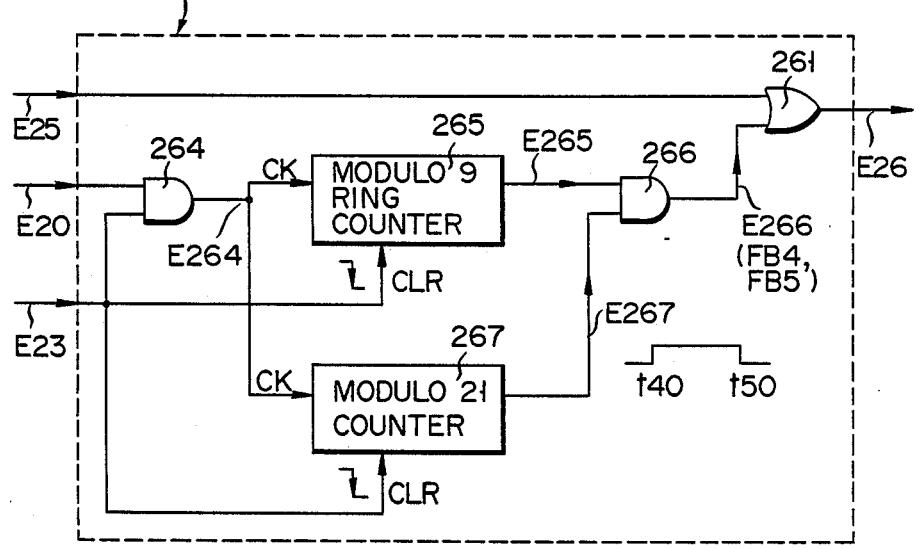
FIG. 26 is a circuit diagram showing an arrangement of fixed bit insertion circuit 26 when the bit pattern in FIG. 2 is created.

The resultant signals E21 to E23 and clock E20 are supplied to insertion circuit 24 in FIG. 25. Sync signal E21 and information bit signal E22 are supplied to the first input of OR gate 241. Signal E23 is supplied to the D input terminal of D type flip-flop (D.FF) 242. D.FF 242 is clocked in response to E20. Signal E242, delayed by one clock E20, is output from D.FF 242. The inverted logical value of signal E242 and the logical AND of signal E23 are gated by AND gate 243, thereby obtaining signal E243 including fixed bit FB1 (FIG. 24E) having a one-clock width of clock E20. Signal E243 is supplied to the second input of OR gate 241.

Signal E23 and clock E20 are input to AND gate 244. Clock E20 is gated through gate 244 for a period (t30 to t50 in FIG. 24D) in which signal E23 is kept at logic "1", and serves as counter clock pulse E244.

Pulse E244 is supplied to clock input CK of modulo 9 ring counter 245. Counter 245 outputs carry output E245 corresponding to the fixed bit for every nine pulses. Output E245 is supplied to the first input of AND gate 246.

Pulse E244 is also supplied to clock input CK of modulo 21 counter 247. When counter 247 counts 21 pulses, it outputs carry output E247.

Signal E23 is supplied to the S input of reset/set flip-flop (RS·FF) 248. RS·FF 248 is set at the leading edge of E23 and reset at the leading edge of E247 from counter 247. RS·FF 248 outputs gate signal E248 having a duration from the start time (t30 in FIG. 24A) of second field B to 21st clock (t40 in FIG. 24A). Signal E248 is supplied to the second input of AND gate 246. Two fixed bits (FB2 and FB3 in FIG. 24E) pass through gate 246. Output E246 in carry output E245 from gate 246 is supplied to the third input of OR gate 241. Signal E24 (FIG. 24E), corresponding to the sum of signals E21, E22, E243, and E246, is obtained from OR gate 241.

Counters 245 and 247 are simultaneously cleared by the trailing edge (t50 in FIG. 24D) of signal E23, and the standby operation for the next frame is thus completed.

Check bit generator 25 in FIG. 1 generates check bit signal E25 (FIG. 24F) from the trailing edge (t40 in FIG. 24E) of signal E24 within one frame. Signal E25, signal E23, and clock E20 are input to insertion circuit 26 in FIG. 26. Signal E25 is first supplied to the first input of OR gate 261. Signal E23 and clock E20 are input to AND gate 264. Modulo 9 ring counter 265 and modulo 21 counter 267 are clocked in response to output E264 from gate 264. Whenever counter 265 counts nine pulses E264, it outputs carry output E265. Whenever counter 267 counts 21 pulses E264, it outputs carry output E267.

Counter outputs E265 and E267 are input to AND gate 266. Whenever counter 265 counts 9 pulses E264, E265 is input to AND gate 266. However, until counter 267 counts 21 pulses, output E266 from gate 266 is kept at logic "0". When counter 267 counts up 21 pulses E264 (t40 in FIG. 24A) upon opening of gate 264 (t30 in FIG. 24A), E267 becomes logic "1" so that subsequent pulses E265 after time (t40) pass through gate 266. Signal E266 output from gate 266 becomes signal E266 including fixed bits (FB4 and FB5 in FIG. 24G) to be inserted in check bit signal E25 in second field B. Signal E266 is supplied to the second input of OR gate 261, and signal E266 (FIG. 24G), corresponding to signal E25 +E266, is output from gate 261.

Counters 265 and 267 are simultaneously cleared at the trailing edge (t50 in FIG. 24D) of signal E23, thereby completing the standby operation for the next frame.

Signals E24 (FIG. 24E) and E26 (FIG. 24G) are combined to obtain one-frame cyclic data (FIG. 24H) having the pattern in FIG. 2.

Figure 27:
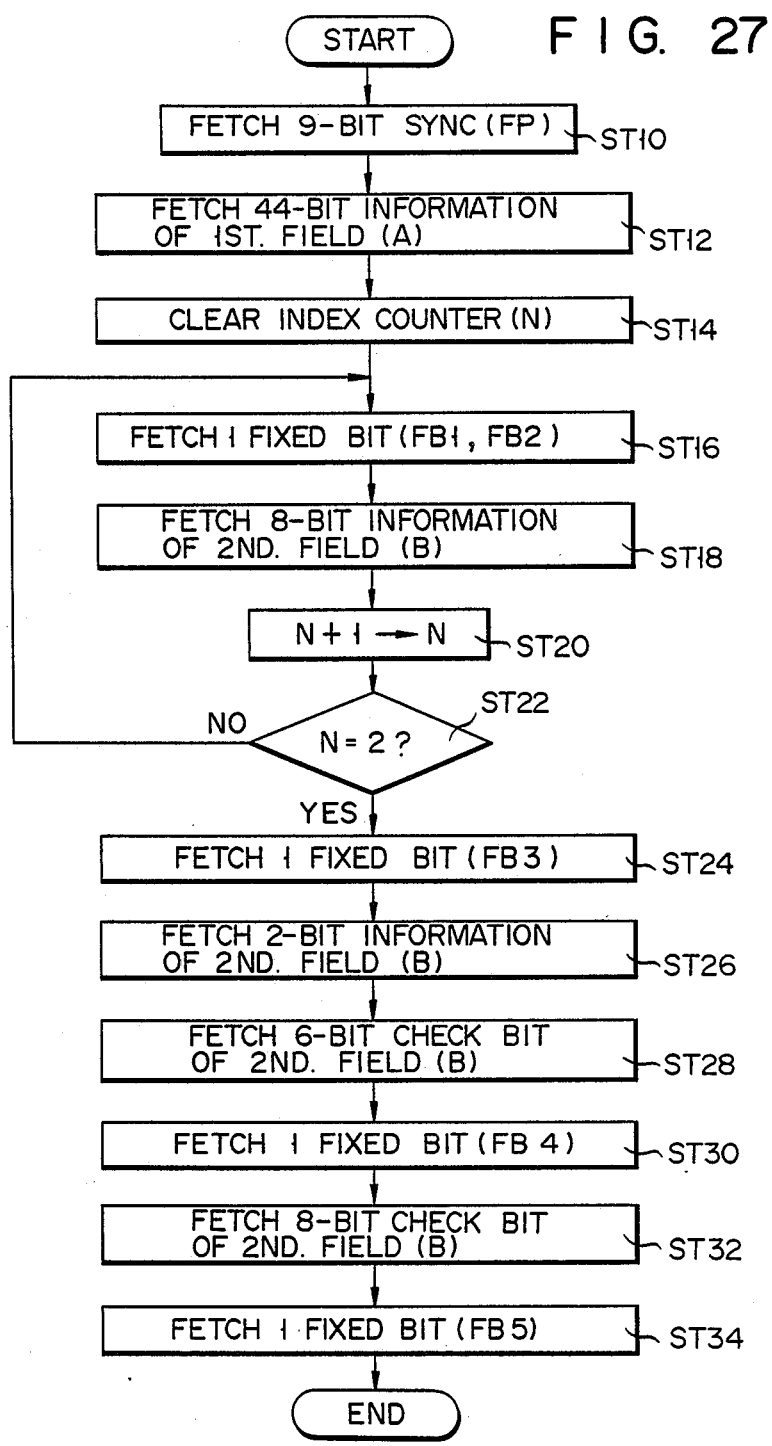
FIG. 27 is a flow chart for explaining the procedures for causing a microcomputer to fetch the bit pattern of FIG. 2 when circuit elements 29 to 31 in FIG. 1 are embodied by using the microcomputer.

FIG. 27 is a flow chart for exemplifying how to fetch bit pattern in FIG. 2 or FIG. 24H in a microcomputer when frame data having this bit pattern is processed using the microcomputer. The microcomputer first fetches 9-bit sync signal (t10 to t20 in FIG. 24B) (ST10). The microcomputer then fetches 44 information bits in first field A (t20 to t30 in FIG. 24C; ST12) and clears content N of an index counter (not shown) (ST14).

The microcomputer fetches the first fixed bit (FB1 in FIG. 24E) in second field B (ST16) and then the following eight information bits (ST18). Content N of the index counter is incremented from "0" to "1" (ST20), and the microcomputer determines if N=2 (ST22). Since N=1 (NO at ST22), the microcomputer fetches the fixed bit (FB2) and eight information bits (ST16 and ST18). Subsequently, the count of the index counter is incremented (ST20), N=2 is established (YES at ST22), and the loop of ST16 to ST22 ends.

The microcomputer fetches the third fixed bit (FB3) of second field B (ST24) and then two information bits (ST26). The microcomputer then sequentially fetches six check bits (ST28), the fourth fixed bit (FB4) (ST30), eight check bits (ST32), and the fifth fixed bit (FB5) (ST34), thereby finishing fetching of the one-frame data pattern.

Figure 28:
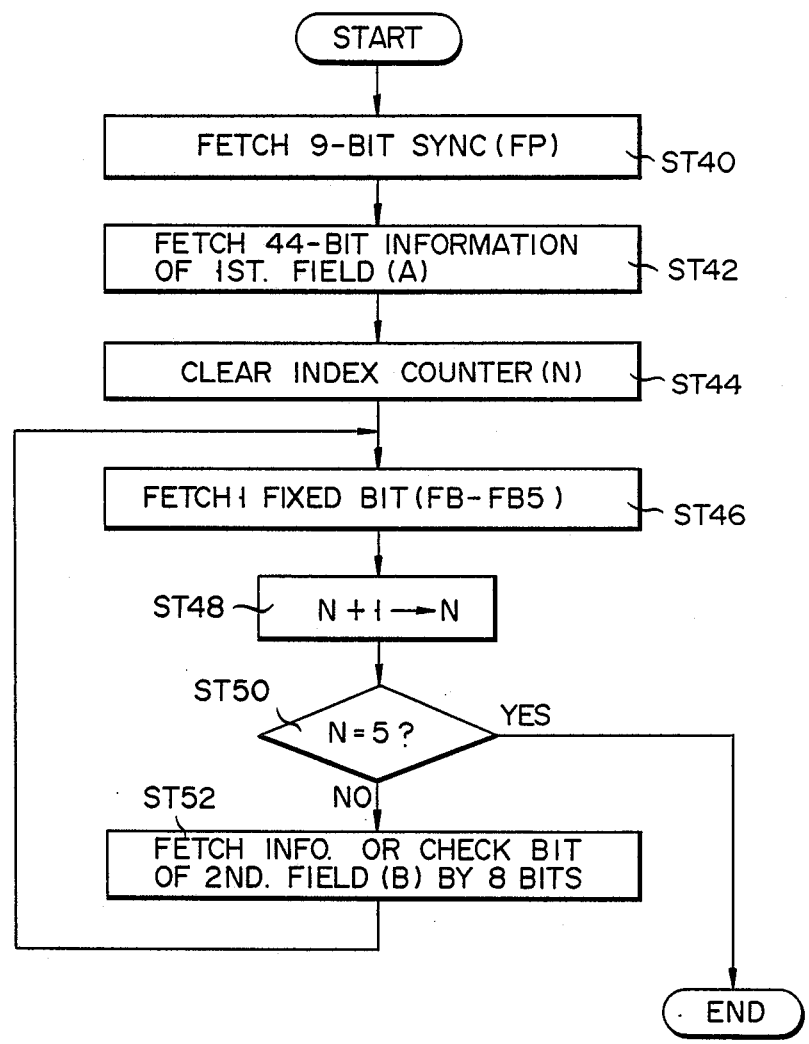
FIG. 28 is a flow chart showing a modification of that in FIG. 27.

FIG. 28 shows a modification of the flow chart in FIG. 27. This modification shows a flow chart of other procedures for performing the same operations as in FIG. 27. Steps ST40 to ST44 in FIG. 28 are identical with steps ST10 to ST14, while the steps after step ST46 are different from those in FIG. 27. The microcomputer fetches the first fixed bit FB1 in second field B (ST46) and increments content N of an index counter (not shown) by one (ST48). The microcomputer then checks if the content is equal to 5 (ST50). In the step wherein fixed bit FB1 is fetched, N=1 is established (NO at ST50) so that eight information bits are fetched and the flow returns to step ST46.

Fetching of the fixed bits and the information or check bits is repeated four times (ST46 to ST52). N=5 is then established (YES at ST50), and fetching of the one-frame data pattern is completed.

Figure 29:
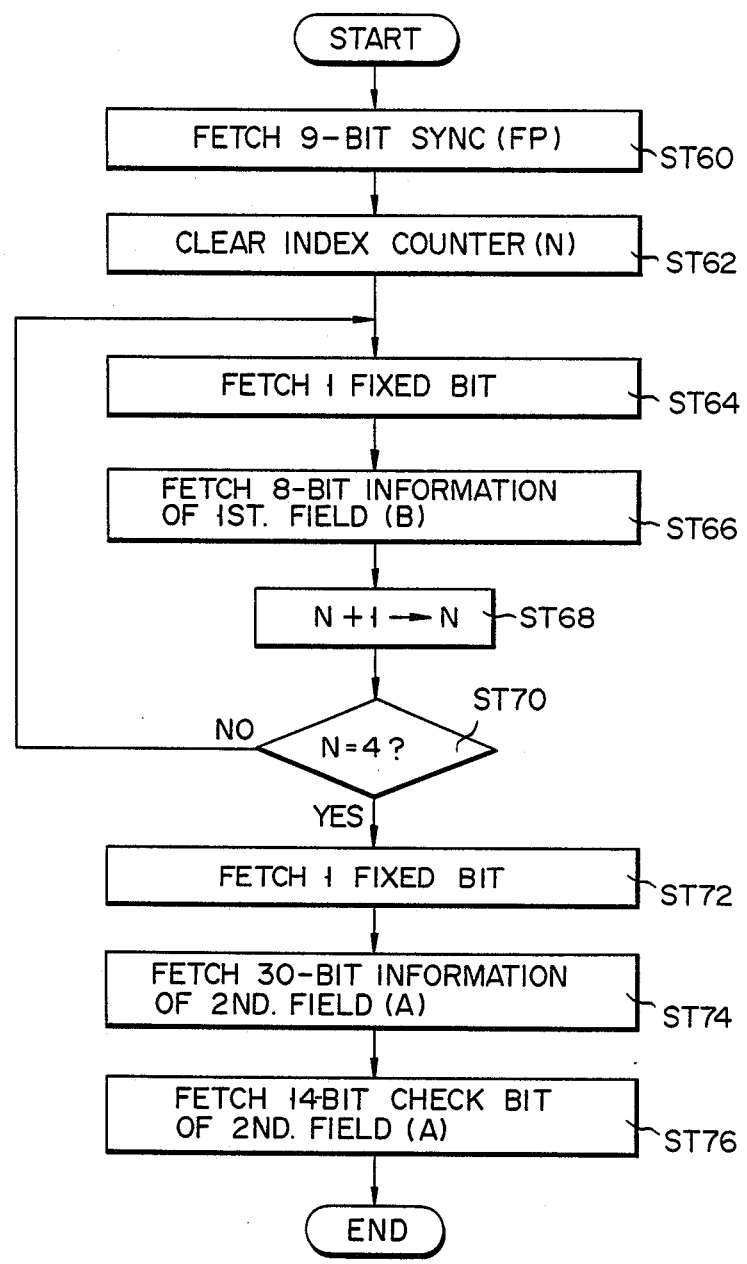
FIG. 29 is a flow chart for explaining the procedures for causing a microcomputer to fetch the bit pattern of FIG. 6 when circuit elements 29 to 31 in FIG. 1 are embodied by using the microcomputer.

FIG. 29 is a flow chart for exemplifying how to cause a microcomputer to fetch the pattern of FIG. 6 when frame data having the bit pattern in FIG. 6 is processed using the microcomputer. The microcomputer fetches the 9-bit sync signal (ST60). Content N of an index counter (not shown) is cleared (ST62). Subsequently, one fixed bit is fetched (ST64), and eight information bits in first field A are then fetched (ST66).

When one fixed bit and eight information bits are completely fetched, content N of the index counter is incremented by one (ST68). The microcomputer checks whether N=4 is established (ST70). Since N=1 (NO at ST70), the flow returns to ST64. The routine of steps ST64 to ST70 is repeated four times. If N=4 (YES at ST70), then another fixed bit is fetched (ST72). If data fetching of first field B is completed, 30 information bits of second field A are fetched (ST74) and 14 check bits are fetched (ST76), thereby completing the one-frame data pattern.

FIG. 30 is a modification of the flow chart in FIG. 29, and shows a flow chart for other procedures for fetching the bit pattern of FIG. 6. Steps ST80 to 84 in FIG. 30 are the same as ST60 to ST64 in FIG. 29. Step ST86 and subsequent steps in FIG. 30 are different from those in FIG. 29. After one fixed bit is fetched (ST84), content N of the index counter is incremented by one (ST86) and the microcomputer checks if N=5 (ST88). If N=1, 2, 3, or 4 (NO at ST88), eight information bits in first field B are fetched (ST90) and the flow returns to step ST84. When the loop of ST84 to ST90 is repeated five times (YES at ST88), 30 information bits in second field A are fetched (ST92) and 14 check bits are fetched (ST94), thereby completing the fetching of the one-frame data pattern.

In the flow charts in FIGS. 27 to 30, the fixed bit can be "1" or "0". The numbers of information and check bits can be arbitrarily selected. The fetch timings of sync signals (FP) in the first steps (ST10, ST40, ST60, and ST80) in FIGS. 27 to 30 can be determined by using the software of FIG. 5 or the hardware of FIG. 4 or 8.

In the frame sync method in a cyclic information transmission system according to the present invention, the fixed bits are inserted in only half of one frame so that a sync pattern does not appear in the half containing the fixed bits. The pattern formed of the interval in which the sync pattern does not appear and of the sync signal is used for the remaining half of the frame. The portion in which the fixed bits need not be inserted is about ½ of one frame. Therefore, transmission efficiency can be improved compared with the method using the pattern in FIG. 10 or 23.

What is claimed is:

1. A frame synchronization method in a cyclic information transmission system employing a frame structure having a unique pattern with a minimum number of fixed bits, comprising the steps of:
   constituting a one-frame data format by an L-bit sync signal, an M-bit first field, and an N-bit second field, so that a relation $L+N>M$ is satisfied; and
   constituting the L-bit sync signal by continuous bits of a first logic level, inserting a fixed bit of a second logic level at both end positions of the second field, and inserting a fixed bit of a second logic level between said two end positions by a bit interval of not more than L-1 bits where said second field is adjacent to said first field.

2. A frame synchronization apparatus according to claim 1, comprising:
   data combining means for producing transmission data alternately including the first and second fields; and
   frame sync detecting means, responsive to the transmission data, for detecting the sync signal from the transmission data.

3. An apparatus according to claim 2, wherein said frame sync detecting means includes:
   sync code detecting means for detecting a sync code, having the same pattern as that of the sync signal, from a code corresponding to the transmission data; and
   determining means, not responsive to the sync code included in the M bits after detection of the sync code, for determining as the sync signal the sync code included in a data string which appears after the M bits.

4. An apparatus according to claim 3, wherein said determining means includes:
   counter means adapted to be cleared upon detection of the sync code, for counting pulses having a frequency corresponding to a transmission rate of the transmission data; and
   gate means for outputting the sync code as the sync signal only if a count output of said counter means reaches a value corresponding to the M bits.

5. An apparatus according to claim 2, wherein said data combining means includes:
   sync generating means for generating the sync signal;
   information bit generating means for generating information bits included in said one frame;
   position signal generating means for generating a field position signal representing a position of the second field within said one frame; and
   first fixed bit inserting means for inserting the fixed bits in the information bits at a predetermined bit interval only when the field position signal is being generated.

6. An apparatus according to claim 5, wherein said data combining means further includes:
   check bit generating means for generating check bits, included in said one frame, at intraframe positions where the information bits are not generated; and
   second fixed bit inserting means for inserting the fixed bits in the check bits at a predetermined bit interval when the field position signal is being generated.

7. A frame synchronization method in a cyclic information transmission system of a frame structure having a unique pattern of fixed bits, comprising the steps of:
   constituting a one-frame data format by an L-bit sync signal, an M-bit first field, and an N-bit second field;
   setting one bit in the sync signal at a boundary between the sync signal and the first field to be logic of a second logic level, and setting bits of the sync signal to be a first logic level;
   inserting one fixed bit of second logic level at a boundary between the second field and the first field, and inserting a fixed bit of second logic level in the second field at a position within L bits from the boundary between the sync signal and the second field;
   inserting fixed number of bits of a second logic level in the second field in at least an L - 2 bit interval except in those bit positions which are the boundary between the sync signal and the second field; and
   satisfying the relation $L+N>M+2$.

8. A frame synchronization apparatus in a cyclic information transmission system employing a frame structure having a unique pattern with a minimum number of fixed bits, comprising:

means for constituting a one-frame data format by an L-bit sync signal, an m-bit first field, and an N-bit second field, so that a relation $L+N>M$ is satisfied; and means for constituting the L-bit sync signal by continuous bits of all bits having a first logic level, inserting a fixed bit of "1" (or "0") at both end positions of the second field, and inserting a fixed bit of a second logic level between said two end positions by a bit interval of not more than $L-1$ bits wherein said second field is adjacent to the first field.

* * * * *